Figure 3:
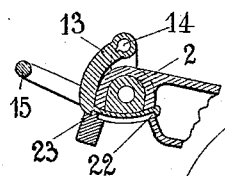

E. RIMAILHO.
GUN CARRIAGE FOR ORDNANCE.
APPLICATION FILED MAY 5, 1915.
1,225,492.
Patented May 8, 1917.
9 SHEETS—SHEET 1.
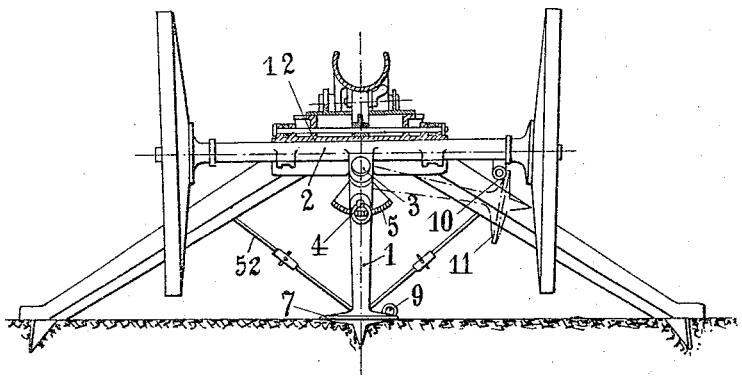
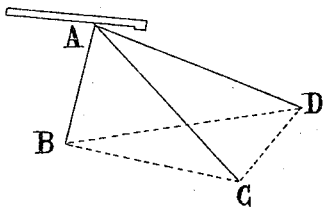
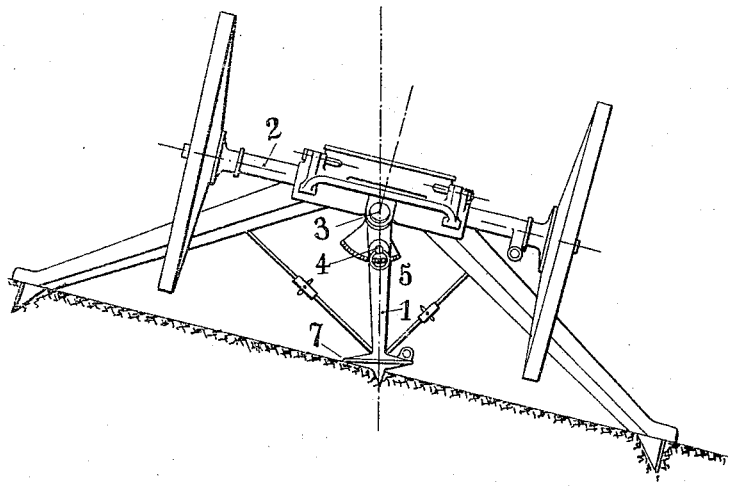
INVENTOR
Emile Rimailho
BY
ATTORNEYS

E. RIMAILHO.
GUN CARRIAGE FOR ORDNANCE.
APPLICATION FILED MAY 5, 1915.

1,225,492.

Patented May 8, 1917
9 SHEETS—SHEET 2.

INVENTOR
Emile Rimailho
BY
ATTORNEYS

E. RIMAILHO.
GUN CARRIAGE FOR ORDNANCE.
APPLICATION FILED MAY 5, 1915.

1,225,492.

Patented May 8, 1917.
9 SHEETS—SHEET 3.

INVENTOR
Emile Rimailho
BY
ATTORNEYS

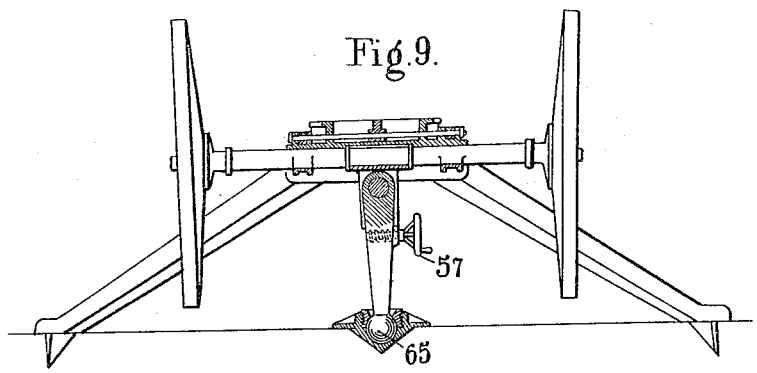
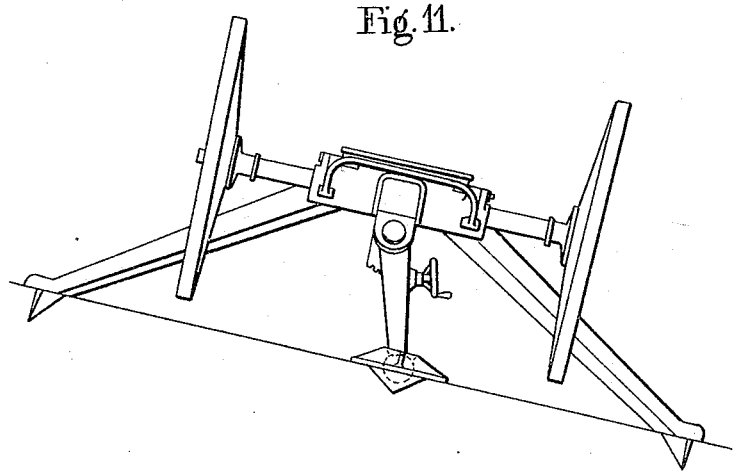

E. RIMAILHO.
GUN CARRIAGE FOR ORDNANCE.
APPLICATION FILED MAY 5, 1915.

1,225,492.

Patented May 8, 1917.
9 SHEETS—SHEET 5.

INVENTOR
Emile Rimailho
BY
ATTORNEYS

E. RIMAILHO.
GUN CARRIAGE FOR ORDNANCE.
APPLICATION FILED MAY 5, 1915.

1,225,492.

Patented May 8, 1917.
9 SHEETS—SHEET 6.

INVENTOR
Emile Rimailho
BY
ATTORNEYS

E. RIMAILHO.
GUN CARRIAGE FOR ORDNANCE.
APPLICATION FILED MAY 5, 1915.
1,225,492.
Patented May 8, 1917.
9 SHEETS—SHEET 7.
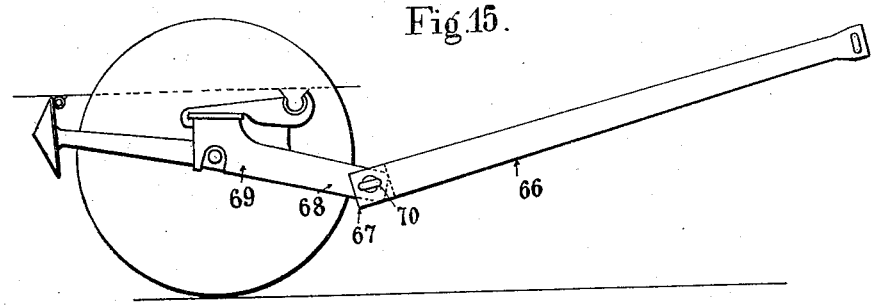
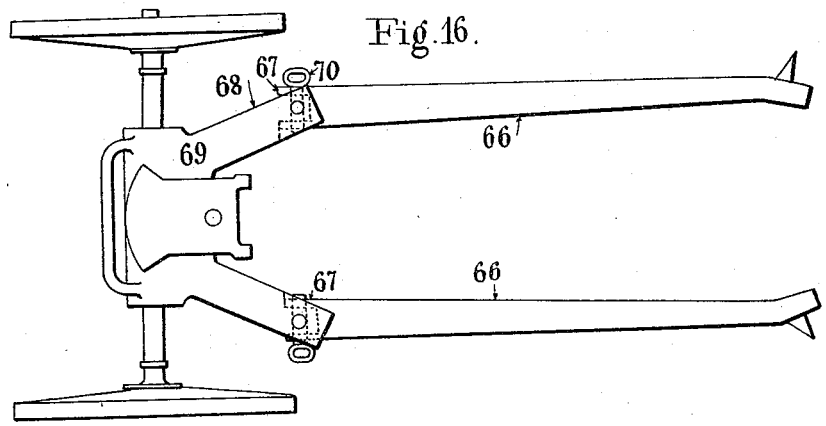
INVENTOR
Emile Rimailho
BY
ATTORNEYS E. RIMAILHO.
GUN CARRIAGE FOR ORDNANCE.
APPLICATION FILED MAY 5, 1915.
1,225,492.
Patented May 8, 1917.
9 SHEETS—SHEET 8.
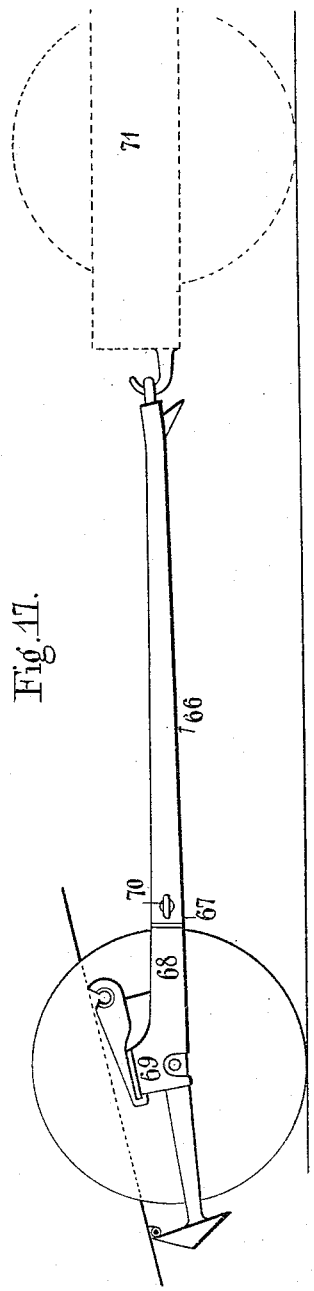
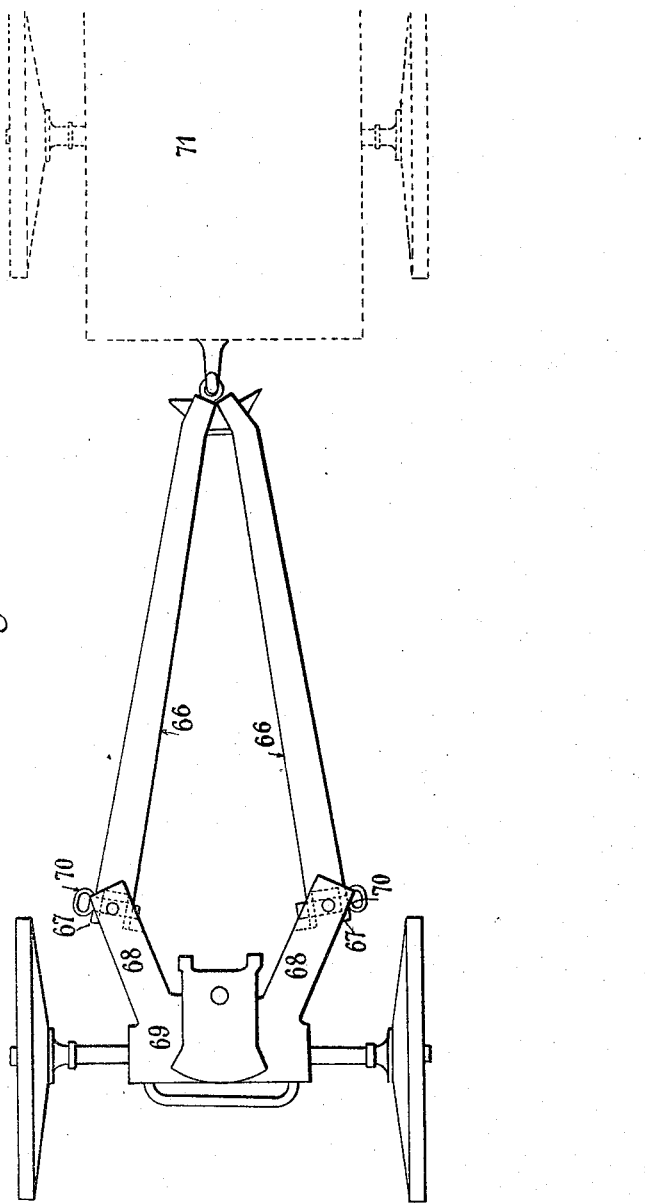
INVENTOR
Emile Rimailho
By Munn & Co.
Attorneys

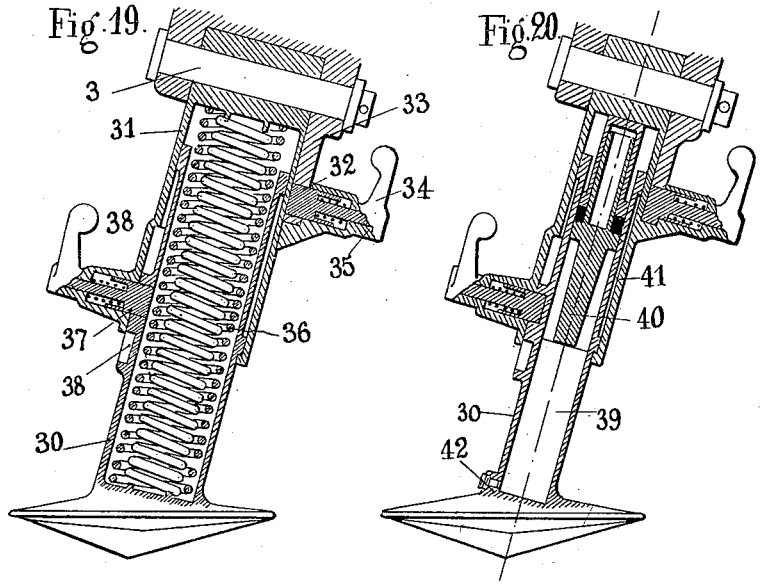
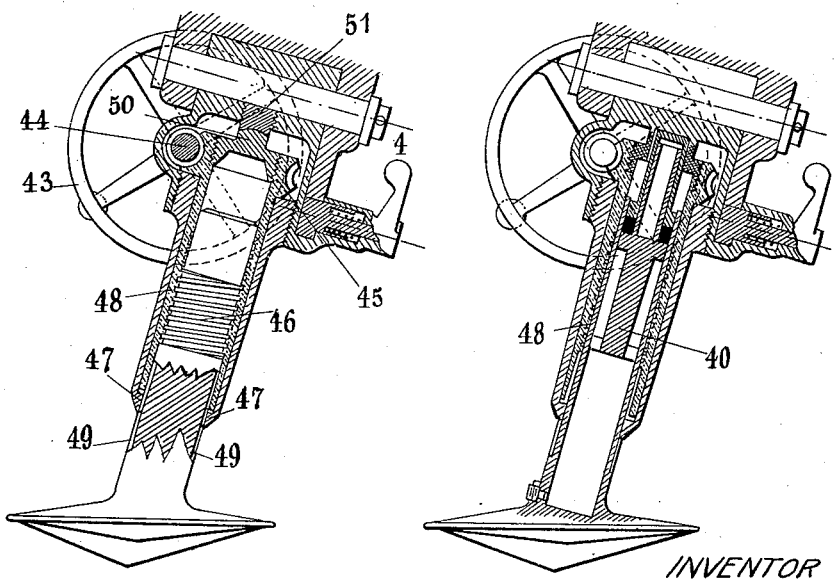

UNITED STATES PATENT OFFICE.

EMILE RIMAILHO, OF PARIS, FRANCE, ASSIGNOR TO COMPAGNIE DES FORGES ET ACIERIES DE LA MARINE ET D'HOMECOURT, OF PARIS, FRANCE.

GUN-CARRIAGE FOR ORDNANCE.

1,225,492.  Specification of Letters Patent.  Patented May 8, 1917.

Application filed May 5, 1915. Serial No. 25,968.

*To all whom it may concern:*

Be it known that I, EMILE RIMAILHO, a citizen of the French Republic, and residing at 98 Rue de la Victoire, Paris, France, consulting-engineer, have invented certain new and useful Improvements in and Relating to Gun-Carriages for Ordnance, of which the following is a complete specification.

Gun carriages for ordnance, as a rule bear on the ground by means of two wheels at the forward end and a trail and spade at the rear so that the angle of support presents its base toward the side on which the gun is trained while its apex points in the opposite direction. This arrangement renders it very difficult to increase the angle of training of the gun in direction and elevation, due partly to the fact that the direction no longer passes through the point of support of the spade, and partly because if the gun recoiled under a great angle it would meet the trail of the gun carriage.

In order that the triangle of support may assume a converse position, having its apex pointing to the side on which the gun is trained, and its base facing the opposite direction, it is sufficient to place the gun at the apex A (Fig. 1) of a triangular pyramid A, B, C, D, the sides AC and AD of which are the trail members and AB a strut supporting the gun carriage. The gun may then be trained and laid within the space covered by the trail members AC and AD; this would result in a remarkable increase of the amplitude of the angle of training and laying while the disposition of the three points of support forming the base of this triangular pyramid would insure connection between the gun carriage and the ground.

This invention therefore contemplates the provision of a gun carriage adapted to be supported, irrespective of the nature of the ground by three points of contact. According to the invention, these points of contact are independent of the wheels, two of these points being constituted by the ends of the divided trail diverging toward the rear of the gun, and the third by the end of a strut placed underneath the axle, the length of the strut being such that the wheels are suspended from each end of the axle in the firing position.

Figure 4:
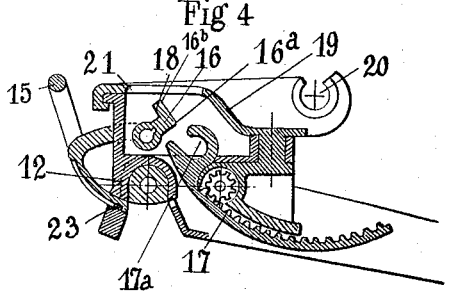
Figure 5:
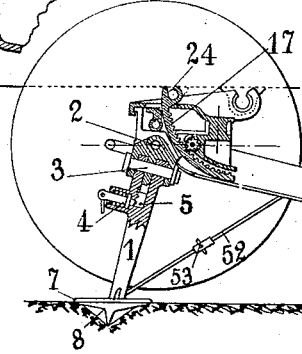
Figure 6:
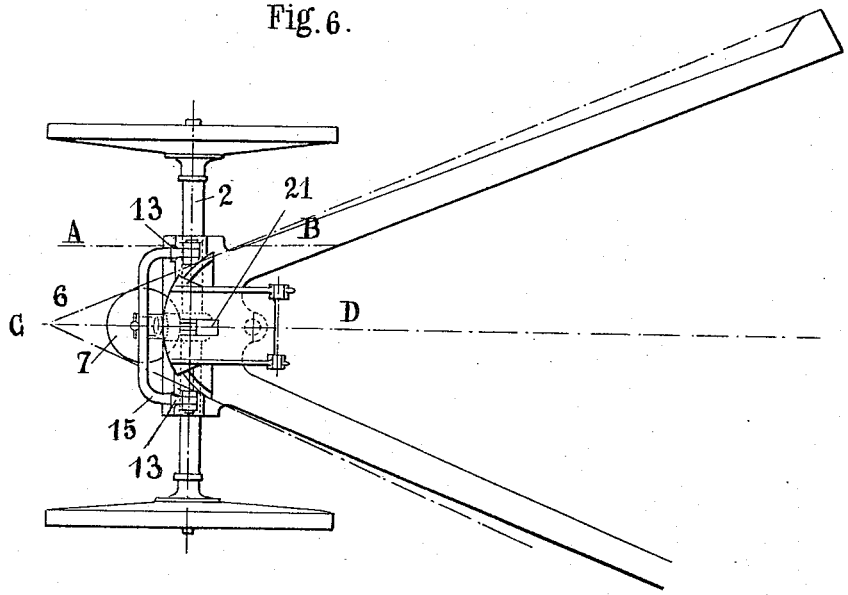
Figure 7:
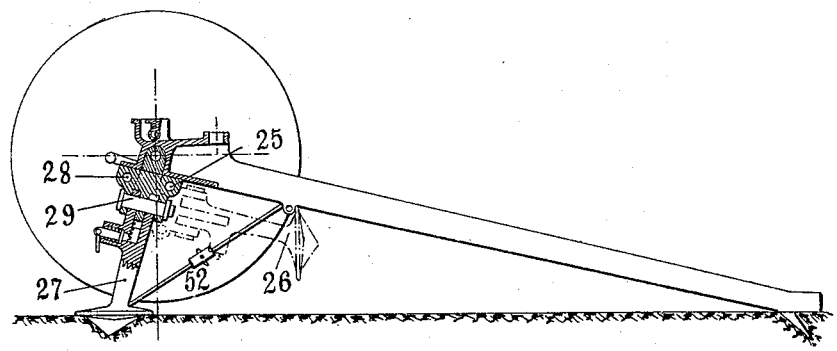
Figure 8:
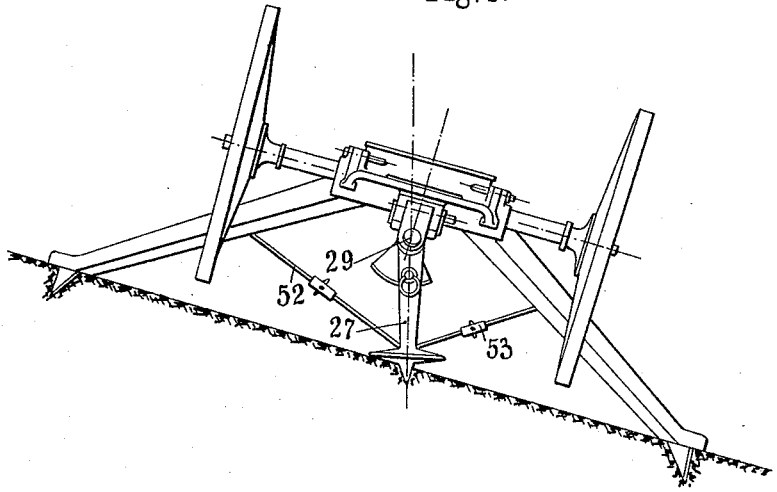
Figure 12:
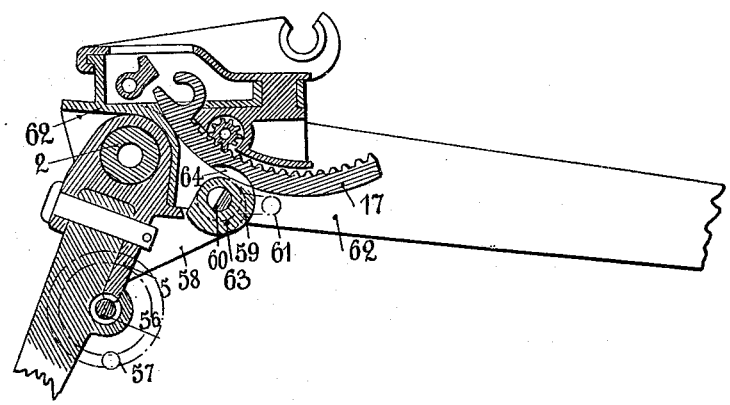
Figure 13:
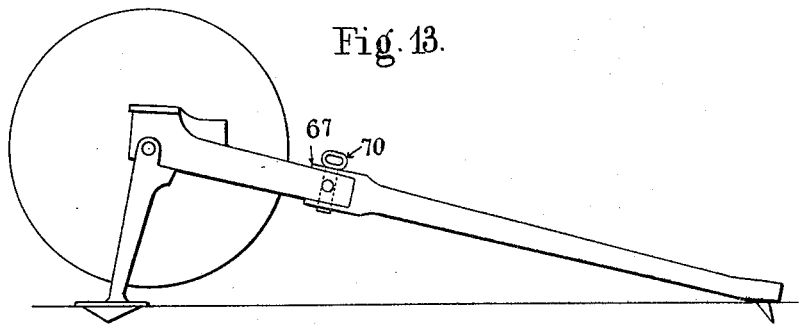
Figure 14:
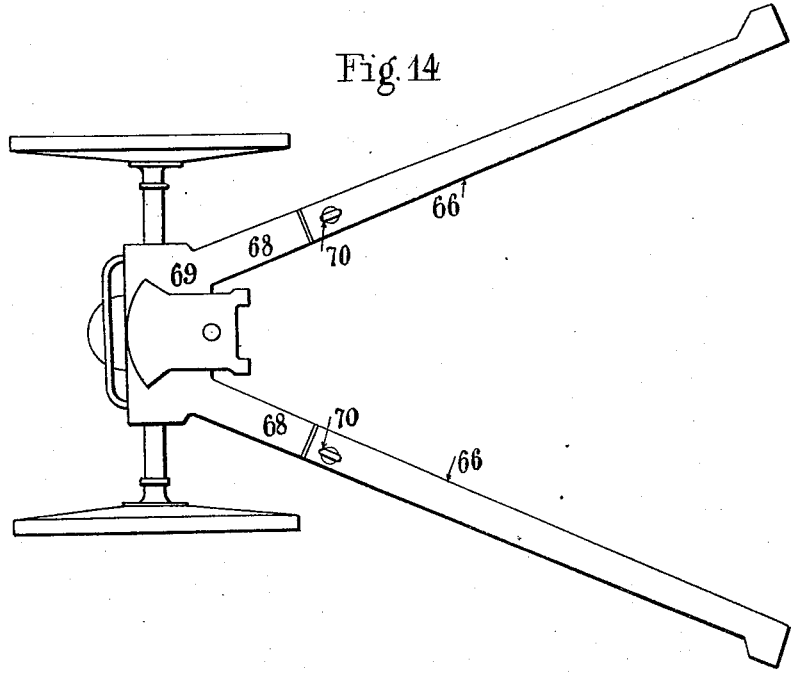

The accompanying drawings illustrate various constructional forms of the gun carriage according to the invention:

Figure 1 is an explanatory diagram,

Fig. 1ª is a sectional end elevation of a first construction more particularly applicable to a gun carriage for mountain artillery adapted to be dismantled for transport upon pack animals, Fig. 2 is an end elevation showing the firing position upon ground sloping transversely, Fig. 3 is a section taken on line A—B of Fig. 6, showing the safety devices insuring connection between the axle and the gun carriage during firing, Fig. 4 is a section taken on line C—D of Fig. 6, showing the axle lock in an elevated position, Fig. 5 is a section taken on line C—D of Fig. 6,

Fig. 6 is a plan,

Figs. 7 and 8 are a longitudinal section and an end view, respectively, of a second construction, Figs. 9 to 12 illustrate a third construction with an additional safety device, Figs. 13 and 14 are an elevation and a plan, respectively, of a gun carriage having detachable trail members, Figs. 15 and 16 show the trail members in a suitable position for coupling up a draft animal, Figs. 17 and 18 show the trail members disposed for connection with a limber, Figs. 19 to 22 are longitudinal sections of various systems of telescopic struts applicable to heavy ordnance or ordnance which cannot be dismantled.

Fig. 1ª shows by way of example, a constructional form in which the gun carriage is supported at the rear by two trails shown in firing position, and at the front by the strut 1; the latter (which in the illustrated construction, comprises a single member) is mounted on the axle 2 and is adapted to pivot about an axis 3 at right angles thereto. It may thus be brought into the vertical position when the ground is sloping transversely (Fig. 2) and locked in the most suitable position by means of the spring lock 4 which engages in the teeth of a sector 5 belonging to the axle 2. The apex (Fig. 6) of the triangle of support is displaced in this manner according to the slope of the ground which insures a good seating of the gun upon any ground.

The strut 1 is formed at one end with a shoulder 7, for example, of polygonal shape, extended by a rib 8 which in the firing position illustrated, penetrates the ground and prevents sliding of the carriage. The shoulder 7 of the strut may be provided with any system of articulation, ball joint 65 (Fig. 9), parallelogram or otherwise, so as to insure its constant parallelism with the ground. A perforated lug 9 is adapted to receive, during transport, the end of a spring bolt 10 on the axle; the strut then occupies the position 11 shown in dash-dotted lines in Fig. 1. This strut may, of course, be maintained in the position for transport in any suitable manner, for instance, by means of a chain, cable or any other suitable coupling device.

With a view to the application of this device to a gun carriage adapted to be dismantled, the axle sleeve 12 may be hollowed out on its lower side throughout its length and surround the axle to which it is connected by the lower part of a double lock 13 oscillating about the shaft 14 when the handle 15 is acted upon.

The preceding construction has shown a strut connected with the axle, Figs. 7 and 8 illustrate a modification showing that it is possible to mount this strut upon the gun carriage. It is then provided with a double articulation:

(a), around an axis 25 which permits by tipping over, of bringing the strut from the road position 26 to the firing position 27 in which it is locked by the pin 28 which penetrates lugs provided on the axle sleeve;

(b), around an axis 29 which allows of the strut being brought into the vertical plane for firing purposes when the ground slopes transversely; the other members being identical with those mentioned above.

In order to insure connection between the axle and gun carriage in cases where the latter is adapted to be dismantled, a safety device has been provided which renders the separation of these two members impossible during firing, for instance, as long as the elevating arc is connected to the cradle, by locking in position the screws fixing the gun carriage upon the axle by means of the said elevating arc.

To this end there is keyed upon the shaft 14, in addition to the double lock 13, a cam 16 one of the faces 16ª of which bears against the elevating arc 17 except in the position indicated in Fig. 4 in which it is separated from the cradle. At this moment, should it be desired to connect the elevating arc to the cradle after having placed the gun carriage upon the axle, the laying handle or wheel is rotated so as to bring the head of the arc 24 into the position illustrated in Fig. 5 so that the lug 17ª constituting a part connection between the arc and the cradle, projects above the gun carriage. The arc pushes back, when rising, the face 16ª of the cam 16, which, in its rotation, operates the shaft 14 and the lock 13 should this operation have been previously overlooked during its oscillation the lock slides underneath the axle and thus locks it to the gun carriage.

Conversely, in order to separate the gun carriage from the axle after having removed the cradle, the upper gun carriage 19 is brought into the central position in direction in order that the notch 21 of the said upper carriage shall face the cam 16 and permit of the oscillation of the latter; which was prevented, before this operation, by its face 16ᵇ which abutted against the small gun carriage; the laying wheel is rotated so as to bring the arc 17 into the position indicated in Fig. 4. The cam 16 which no longer abuts against the arc 17 and against the small carriage 19 by its faces 16ª and 16ᵇ, can now oscillate at the same time as the lock 13 by exerting a tractive effort on the handle 15 until the face 22 of the said lock abuts against the pin 23 of the axle sleeve. At this moment the sleeve is completely released and it can be separated from the gun carriage by raising the latter by means of the handle 15.

In order to insure the rigidity of the whole of the trail members and of the strut during firing, a suitable number of tie members or stays 52 may be arranged as shown in Figs. 1 to 8, connecting the lower part of the strut with the trail members, the length of the said stays being capable of adjustment by means of the turn-buckles 53.

Figure 10:
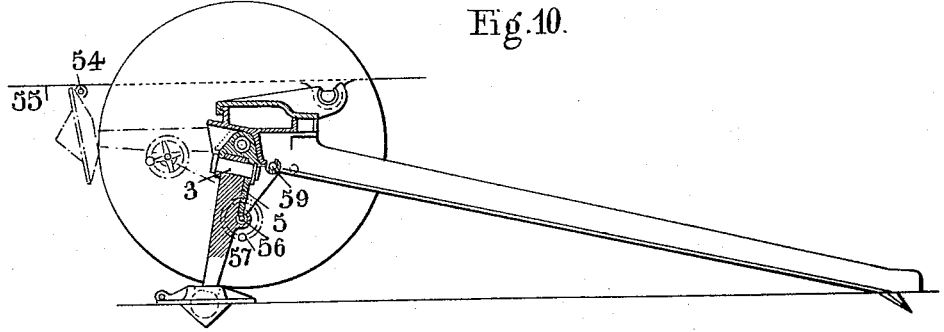

In the construction illustrated in Figs. 9 to 12, the sector 5 is adapted to oscillate freely about the axle 2, the strut assuming then on the road, the position shown in dash-dotted lines in Fig. 10, in which it is connected in any desired manner with the cradle 55, for instance, by means of a bolt 54. The sector 5 is formed with helical teeth meshing with a worm 56 journaled in the strut and provided with an operating wheel 57 which permits of the strut being brought more easily and more accurately into the required transverse direction for firing purposes.

This sector 5 is formed on its rear face, with a portion 58 (Figs. 10 and 12) provided with hooks 59 adapted to be engaged by a revoluble semi-shaft 60 or a detachable shaft having a controlling handle 61 mounted upon the gun carriage 62 so as to insure rigid connection between the strut and the gun carriage for firing purposes.

In this construction, additional safety is insured for example, by a cam 63 integral with the semi-shaft 60 and bearing constantly, in the firing position shown in Fig. 12, against the elevating arc 17, thus preventing any separation between the strut and the gun carriage as long as the cradle is connected with the said elevating arc. This cam 63 is adapted to penetrate a recess 64 formed in the elevating arc 17 thus preventing any movement on the part of the arc as long as the semi-shaft 60 has not been turned so as to lock the strut in the position illustrated in Fig. 12.

This construction can be rapidly put in condition for transport over roads; it suffices to turn the semi-shaft 60 and draw the trail members in a rearward direction until the wheels rest on the ground; the strut pivots about the shaft and may be hooked on to the cradle in the position indicated in dash-dotted lines in Fig. 10.

In order to return to the firing position, the strut is unhooked, its point coming into contact with the ground; the trail members and the ends of the axle are taken hold of and the gun is pushed in a forward direction so as to detach the wheels from the ground until the part 58 abuts against the body of the gun carriage in the position shown in Figs. 10 and 12 in which they are locked by turning the semi-shaft 60.

The position described in Figs. 9 to 12 may be inverted and the strut tipped over in a rearward direction for obtaining the road position.

In the preceding examples, the two rear trail members have been shown in firing position; it is clear, however, that for transport upon pack animals or upon wheels, they may be detachable, and adapted to be dismantled or pivoted in any desired manner.

These trail members may also be used for coupling up to a draft animal or for limbering-up purposes.

As illustrated in Figs. 13 to 16, the forward end of each trail member 66, is forked at 67 in two different planes so as to receive the rear end of a corresponding stump 68 of the gun carriage 69 and constitute a rigid assembly permitting of giving the trail members two different directions, i. e. to maintain them apart in the firing position, (Figs. 13 and 14) or bring them in a position suitable for coupling up directly to a draft animal (Figs. 15 and 16). The trail members are adapted to be locked in these positions by means of a suitable locking member such as, for example, the axis or pin 70.

In order to pass from the firing position illustrated in Figs. 13 and 14 to the road position illustrated in Figs. 15 and 16, the pins 70 are removed, each trail member is separated from the gun carriage, placed on the ground, the forked ends of these members are fitted on the lateral faces of the stumps 68 and the pins 70 put in place. The converse operation is effected for passing from the road position to the firing position.

The fitting faces of the stumps 68 may be formed in such a manner that for the road position the rear ends of the trail members 66 may be joined with a view to their connection with a limber 71 as illustrated in Figs. 17 and 18.

In view of the application of the strut to heavy field ordnance or ordnance not adapted to be dismantled, and if it is desired to avoid placing the gun in firing position by pivotal movement, the strut is made telescopic and a mechanism is provided for raising automatically or by hand, the front part of the gun, during which the ends of the trail members rest on the ground.

Figs. 19 to 22 illustrate various systems which render this operation possible.

Fig. 19 illustrates a strut constituted by a tube 30 sliding in a sleeve 31 pivoting about the axis 3 and locked in this position by the spring controlled bolt 32. The latter is adapted to penetrate a series of apertures formed in the sector 5 (Fig. 5) or 33 (Fig. 19) belonging to the axle and controlled by a lever 34 which when pivoted rises upon a helically formed surface 35. A plurality of concentric springs 36, preferably of different pitch, tend, owing to their tendency to expand, to raise the gun. A bolt 37 arranged like the bolt 32 arrests the tubes 30 and 31 in either of the positions "strut extended" and "strut collapsed" by penetrating the recesses 38 formed in the tube 30.

The extreme tensions of the springs 36 differ in proportion to the extension of the strut. In the strut a greater number of springs or groups of springs, may be provided, either independently of one another or otherwise.

Fig. 20 illustrates a modification of the preceding device in which the energy requisite for raising the gun is obtained by the expansion of a gas compressed in the chamber 39 of the tube 30. A diaphragm 40 transmits the tension of the gas to the surrounding sleeve 41. This diaphragm which is independent of its sleeve, is merely housed in the latter so as to insure fluid-tightness notwithstanding the deformations of the said sleeve. The diaphragm may, of course, be rendered integral with the upper part of the strut either by means of an articulated joint or a rigid connection. A filling or supply plug 42 serves to allow the compressed gas to penetrate into the chamber 39.

Fig. 21 illustrates a device which permits of raising the gun mechanically. By turning the controlling wheel 43 a worm 44 is rotated either directly or through the medium of toothed gear wheels, which controls a worm wheel 45 forming a nut, mounted on the screw-threaded foot of the strut. Two tappets 47 of the sleeve 48 slide in the two longitudinal slots 49 of the foot 46 and thus prevent the rotation of the latter. A screw-threaded pin 50 engaging the worm wheel effects a connection between the foot of the strut and the sleeve through the medium of the member 51.

When the weight to be raised is too great, for instance, in the case of ordnance of a large caliber, and in order not to render the movement too slow, the operation may be facilitated by combining the mechanical operation with the expansion of a gas or of a spring.

Fig. 22 illustrates the realization of such an arrangement by grouping the systems illustrated in Figs. 20 and 21.

What I claim is:

1. A gun carriage, and means for supporting the gun carriage at three points of contact independent of the wheels, the said means comprising trail members diverging toward the rear, the ends of the trail members forming two of the points of contact, and a strut placed underneath the axle, the end of the strut forming the other point of contact with the ground.

2. A gun carriage having trail members diverging toward the rear and forming two points of contact with the ground, and a strut placed underneath the axle of the gun carriage, the end of the strut forming the other point of contact, the strut being of such length that the wheels of the gun carriage are raised from the ground when the parts are in the firing position.

3. In a gun carriage, the combination with the wheels and axle, of means for supporting the gun carriage independent of the wheels and comprising a divided trail, the members diverging toward the rear and provided at their ends with means for penetrating the ground, to prevent recoil of the gun carriage, and a strut arranged between the wheels, and centrally of the axle, the strut being provided at its end with means for penetrating the ground, the said strut being of such length that when in supporting position on the ground with the gun in firing position, the wheels of the gun carriage are raised from the ground, the weight of the parts being supported by the said strut.

4. A gun carriage with a large training angle for ordnance, provided with rearwardly extending diverging trail members adapted to engage the ground, a strut arranged underneath the axle of the gun carriage at the center thereof and adapted to engage the ground, the trail members and the said strut forming a triangle of support, the base of which is at the rear and formed by the line joining the ends of the trail members, the apex being formed by the point of said strut.

5. A gun carriage, and means for supporting the gun carriage at three points of contact with the ground, independent of the wheels, the said means comprising trail members diverging rearwardly from the gun carriage, and forming two of the points of contact, and a strut extending underneath the axle and forming the other point of contact, the said strut being mounted to swing in a transverse direction to bring the strut into a vertical position, according to the irregularity of the ground.

6. A gun carriage, and means for supporting the gun carriage, comprising trail members diverging rearwardly from the gun carriage, and a strut placed underneath the axle of the gun carriage, the said strut being mounted to swing transversely and also arranged to be moved in a backward and forward direction.

7. In a gun carriage, the combination with the wheels and axle, of means for supporting the gun carriage independent of the wheels, and comprising trail members diverging rearwardly and adapted to engage the ground, a strut arranged between the wheels and extending centrally below the axle, the said strut being of such length that when in a supporting position on the ground the wheels of the gun carriage are raised above the ground, the strut being mounted to be swung transversely and also adapted to be moved in a forward and rearward direction, and means for locking the strut in the desired position.

8. In a gun carriage, the combination with the wheels and axle, of a forward support for the gun carriage comprising a strut extending downward beneath the axle of the gun carriage, and adapted when in supporting position to hold the wheels above the surface of the ground, and rear supports for the gun carriage comprising trail members diverging rearwardly, the rear ends of the trail members when in supporting position being outside of the planes of the wheels.

9. A gun carriage with a large training angle for ordnance, provided with rearwardly extending diverging trail members adapted to engage the ground, a strut arranged underneath the axle of the gun carriage at the center thereof and adapted to engage the ground, the trail members and the said strut forming a triangle of support, the base of which is at the rear and formed by the line joining the ends of the trail members, the apex being formed by the point of said strut, the said strut being connected with the axle by an articulated joint, whereby the strut can be brought into a vertical position, whatever the transverse inclination of the ground, or may be raised against the axle in position for transporting the gun carriage upon roads.

10. A gun carriage, and means for supporting the gun carriage, comprising trail members diverging rearwardly from the gun carriage, and a strut mounted to swing beneath the axle of the gun carriage on a pivot at right angles to the said axle to bring the strut into a vertical position, according to the irregularity of the ground, and means for locking the strut in the desired position.

11. In a gun carriage adapted to be dismantled, the combination with the wheels and axle of the gun carriage, the gun carriage being removably supported on the axle, and means for supporting the axle and gun carriage independently of the wheels, of a safety device comprising a lock mounted to oscillate on the gun carriage, and adapted to engage the axle to lock the same to the gun carriage, and means for holding the said lock in locked position.

12. In a gun carriage adapted to be dismantled, the combination with the wheels and axle of the gun carriage, the gun carriage being removably supported on the axle, and means for supporting the axle and gun carriage independently of the wheels, of a locking device mounted to swing on the gun carriage and adapted to engage the underside of the axle to lock the same to the gun carriage, a cam keyed on the shaft of said locking device, the said cam abutting against the elevating arc when the gun carriage is in the firing position to hold the locking device in locked position.

In testimony whereof I have hereunto set my hand at St. Étienne, France, this third day of April, 1915.

EMILE RIMAILHO.

Copies of this patent may be obtained for five cents each, by addressing the "Commissioner of Patents, Washington, D. C."